United States Patent Office 3,380,941
Patented Apr. 30, 1968

3,380,941
ABLATIVE THERMAL INSULATION COMPOSITION OF A SILICONE, EPOXY RESIN, CORK AND CURING AGENT
David O. Dittman, Anaheim, James J. Licari, Whittier, and Michael Glovak, Yorba Linda, Calif., assignors to North American Rockwell Corporation, a corporation of Delaware
No Drawing. Continuation-in-part of application Ser. No. 205,508, June 27, 1962. This application July 27, 1964, Ser. No. 385,505
3 Claims. (Cl. 260—17.4)

This invention relates to a new ablative thermal insulation composition and more particularly to an insulation composition comprising an adhesive, an elastomer, and a porous material.

This is a continuation-in-part of application Ser. No. 205,508, filed June 27, 1962, now abandoned.

In modern technological processes it often becomes necessary to subject surfaces covering delicate and sensitive instruments to extreme external temperatures. In order to assure continued function of the components comprising these instruments, some sort of protection must be used to nullify the harmful effects of heat to prevent its from reaching the instrumentation. This protection is sometimes given by refrigeration or cooling but these processes are expensive, cumbersome and not readily adaptable to all applications. Protection is also oftentimes given by means of an insulating compound. Prior insulating art in this area, however, discloses that compounds which give high temperature protection become thick and heavy or lack adherence to the coated surface. Also prior art compounds tend to crack and expose certain areas of the surface to heat.

Applicants' composition of an adhesive, an elastomer, and a porous material overcomes the above mentioned defects of the prior art in that it has lightness, adherence, flexibility and ease of application. The compound can be used to cover very complex mechanical shapes to almost any desired thickness. When exposed to extreme temperature environments, the coatings provide exceptional thermal insulation by virtue of their low thermal conductivity. At high temperatures, for example, above 900° F., the material begins to decompose thermally so that much of the radiant heat flux is blocked by a thick black smoke which is liberated from the coating compound during decomposition. Gaseous products of decomposition form a boundary layer which tends to limit convective heat transfer from a high temperature source to the substrate on which the compound has been applied.

Therefore it is an object of this invention to provide a new ablative thermal insulation material having adhesion, elasticity, flexibility, relative lightness and insulation characteristics.

Applicants' invention involves initially the physical mixing of these elements to form what will be referred to as Component A. An adhesive material such as a particular epoxy resin is mixed with a certain type of liquid silicone elastomer. The epoxy imparts an adhesive characteristic to the mixture and the elastomer imparts flexibility, workability, and thermal shock resistance. To this mixture then is added a low density material such as ground cork which imparts to the compound, when cured, a low thermal conductivity and low density.

To Component A there is added a Component B. This second component is comprised of a curing agent for the polymers of Component A, at least one flame retardant and a solvent for those constituents. After the ingredients of Components A and B are thoroughly mixed individually, the two components are then combined and mixed. This is then followed by curing to a solid cohesive material.

In particular, it has been found that the outstanding results of this invention are obtained through the utilization of specified components in particular proportions. It has been found that these results are obtained when Component A is comprised of from 40–55 weight percent of a silicone elastomer such as a polymethyl vinyl siloxane; from 32 to 42 weight percent of an epoxy resin such as a condensation product of epichlorohydrin and bisphenol-A mixed with butyl glycidyl ether as described on page 19 of the book, "Epoxy Resins" by Lee and Neville, published by McGraw-Hill (1957); and from 10–18 weight percent 20–60 mesh cork which means the cork will pass through a screen of 20 apertures per inch and is retained on one of 60 apertures per inch. Most preferred is 20–40 mesh cork. Component B preferably comprises as the curing agent, from 50–70 weight percent of a polyamide; from 7 to 15 weight percent, a flame retardant chlorinated biphenyl which is a 54 percent chlorinated biphenyl; from 7 to 15 weight percent of antimony trioxide as a second flame retardant; and from 12 to 30 weight percent of a suitable solvent for the above ingredients which may, for example, be trichloroethylene.

Components A and B are combined 50 to 150 parts by weight of Component B to 100 parts by weight of Component A. Preferably, the ratio of parts B to A is 75:100. The resulting mixture can then be cured at room temperature or at temperatures up to 300° F. If curing is done at room temperature, it is preferably followed by a short period of heating at about 150 to 175° F. to assure that all the solvent for Component B is removed or driven off.

It is believed that the invention will be further understood from the following detailed examples.

EXAMPLE 1

In a glass beaker, 460 gms. (47.8 weight percent) of polymethyl vinyl siloxane was mixed with 360 gms. (37.4 weight percent) of epoxy resin that is a condensation product of epichlorohydrin and bisphenol-A mixed with butyl glycidyl ether. To this mixture was added 144 gms. (14.8 weight percent) of 20–40 mesh ground cork. The resulting "Component A" was then stirred to a homogeneous constituency. The siloxane is a solution of a copolymer of trimethylsiloxane units and $SiO_2$ units in approximately equal molar ratio in a linear polydimethylsiloxane having a viscosity of 800 centipoises. The ratio of the linear siloxane to the copolymer is about 6:1. The copolymer is described in U.S. Patent No. 2,857,356, while the linear siloxane is described in U.S. Patent No. 2,843,555. In a second beaker, "Component B" was formed by mixing together 72 gms. (10 weight percent) of 54 percent chlorinated biphenyl, 72 gms. (10 weight percent) antimony trioxide, 144 gms. (20 weight percent) trichloroethylene, and 423 gms. (60 weight percent) of a polyamide which is the condensation product of polyamines and dibasic fatty acids of at least 18 carbons in length. The polyamides are described in U.S. Patent No. 2,705,223. This particular polyamide has an amine value of 230–246 and a viscosity of 70° C. of 31–38 poises. Components A and B were then added together and thoroughly mixed to a homogenous state. This final composition was then ready for application.

EXAMPLE 2

To test the ablative composition of Example 1 anodized aluminum panels, 5 inches x 5 inches x ¼ inch were solvent cleaned and then coated with ¼ inch of the composition. The coated panels were then cured at room temperature for 30 hours at which time they were tack free. This was followed by heating at 180° F. for four hours to assure removal of the solvent trichloroethylene. After curing, the specimens were oven heated to 167° F.

and then immersed directly in an alcohol Dry Ice bath at −65° F. After a period of five minutes, the samples were withdrawn from the coolant bath and examined. There was no cracking or peeling or lifting of the coating. Other physical strength tests were performed in accordance with Federal Test Methods. Table I summarizes these results.

TABLE I.—PHYSICAL PROPERTIES

| | |
|---|---:|
| Hardness (Shore A) | 73–75 |
| Specific gravity | 0.722 |
| Lap shear strength (p.s.i.) | 235 |
| Tear strength (p.s.i.) | 32.0 |
| Tensile strength (p.s.i.) | 190 |
| Ultimate elongation (percent) | 29.0 |

EXAMPLE 3

To test the ablative quality of the composition of Example 1, aluminum substrates 3 in. x 3 in. x .032 in. were coated with varying weights of the material which was subsequently cured for 16 hours at room temperature followed by 4 hours at 165° F. thereon.

Chromel-Alumel thermocouples, constructed of number 32 wire, were taped to the center of the substrate's backside with an aluminum foil tape. These assemblies were then bonded to insulating fire brick, hollowed out to permit a passageway for the thermocouple leads and a hemispherical air chamber under the junction of approximately one-half inch in diameter. An acetylene air torch was used to provide the required intense thermal environment. A jig was constructed so that each specimen could be exposed without disturbing the torch in any way. Backside thermocouple outputs were continuously recorded by means of a recording potentiometer. Data taken from these recordings for the four candidate material specimens, having coating weights of 15, 20, and 25 grams, are reported in Table II.

TABLE II

| | Time (sec.) | | | | |
|---|---|---|---|---|---|
| | 20 | 30 | 40 | 50 | 60 |
| | Backside Temperature, F. | | | | |
| Amt. of Ablative Coating: | | | | | |
| 15 grams | 130 | 155 | 180 | 205 | 225 |
| 20 grams | 94 | 105 | 123 | 144 | 165 |
| 25 grams | 75 | 100 | 115 | 127 | 140 |

As can be seen from the results in Tables I and II, the ablative composition of this invention possesses both good strength properties and heat protection. A further indicia of the heat protective quality of the material, the thermal conductivity of the composition of Example 1 is 0.051 B.t.u./hr.-ft.$^2$. The specific heat of the material is 0.225 B.t.u./lb. Following is an example of the ability to injection mold the material.

EXAMPLE 4

A cavity measuring approximately 5 in. x 18 in. x 0.200 in., completely sealed except for an injection port 0.37 inch in diameter and a bleeder hole capable of being plugged, located at the opposite end of the cavity, was filled with the ablative coating of this invention. The material was injected into the cavity at 90 p.s.i. until all the air was forced out. The bleeder hole was plugged, the nozzle removed from the injection port and the compressed compound was allowed to expand freely out of the injection port. After an overnight cure at room temperature, the mold was removed and the slab was further cured for four hours at 168° F. The ablative cured material could then be utilized for a given application.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A curable ablative composition comprising a mixture of:
   Component A which comprises:
      40 to 55 weight percent of a polymethyl vinyl siloxane,
      32 to 42 weight percent of an epoxy resin that is a condensation product of epichlorohydrin and bisphenol-A mixed with butyl glycidyl ether,
      and from 10 to 18 weight percent of 20–40 mesh cork,
   and a Component B which comprises:
      50 to 70 weight percent of a polyamide resulting from the reaction of amino compounds having one or more primary amino groups and fatty acids of at least 18 carbon atoms in length,
      7 to 15 weight percent of chlorinated biphenyl,
      7 to 15 weight percent of antimony trioxide,
      and 12 to 30 weight percent of a solvent for Component B.

2. A curable ablative composition comprising a mixture of:
   Component A which comprises:
      47.8 weight percent of a polymethyl vinyl siloxane,
      37.4 weight percent of an epoxy resin that is a condensation product of epichlorohydrin and bisphenol-A mixed with butyl glycidyl ether,
      and 14.8 weight percent of 20–40 mesh cork,
   and a Component B which comprises:
      60 weight percent of a polyamide resulting from the reaction of amino compounds having one or more primary amino groups and fatty acids of at least 18 carbon atoms in length,
      10 weight percent of chlorinated biphenyl,
      10 weight percent of antimony trioxide,
      and 20 weight percent of a solvent for Component B.

3. The composition of claim 2 wherein said solvent for Component B is trichloroethylene.

No references cited.

WILLIAM H. SHORT, *Primary Examiner.*

J. NORRIS, E. A. NIELSEN, *Assistant Examiners.*